US010625384B2

(12) United States Patent
Park et al.

(10) Patent No.: US 10,625,384 B2
(45) Date of Patent: Apr. 21, 2020

(54) SPINDLE APPARATUS AND OPERATING METHOD THEREOF

(71) Applicants: HYUNDAI MOTOR COMPANY, Seoul (KR); KIA MOTORS CORPORATION, Seoul (KR)

(72) Inventors: Joo Ok Park, Ulsan (KR); Jae Hyeon Park, Hwaseongi-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 234 days.

(21) Appl. No.: 15/797,578

(22) Filed: Oct. 30, 2017

(65) Prior Publication Data

US 2018/0339383 A1 Nov. 29, 2018

(30) Foreign Application Priority Data

May 29, 2017 (KR) .................. 10-2017-0066214

(51) Int. Cl.
| | | |
|---|---|---|
| *B23B 29/034* | (2006.01) | |
| *B23Q 5/04* | (2006.01) | |
| *B23Q 16/00* | (2006.01) | |
| *B23B 31/26* | (2006.01) | |

(52) U.S. Cl.
CPC .......... *B23Q 5/04* (2013.01); *B23B 29/03446* (2013.01); *B23B 31/265* (2013.01); *B23Q 16/00* (2013.01); *B23B 2260/034* (2013.01); *B23Q 2220/006* (2013.01)

(58) Field of Classification Search
CPC ...... B23Q 5/04; B23Q 16/00; B23Q 2220/00; B23B 29/03446; B23B 31/265; B23B 2260/034

USPC ................. 173/31–42, 47–48, 213
See application file for complete search history.

(56) References Cited

U.S. PATENT DOCUMENTS

| | | | | |
|---|---|---|---|---|
| 2,038,611 A | * | 4/1936 | Simonson | ......... B23B 29/03446 82/1.2 |
| 2,278,631 A | * | 4/1942 | Young | ............... B23B 29/03446 408/157 |
| 2,461,436 A | * | 2/1949 | Offen | ................ B23B 29/03446 408/158 |
| 3,119,274 A | * | 1/1964 | Short | ................... B25D 11/106 74/22 R |
| 3,279,285 A | * | 10/1966 | Ivins | .................... G05B 19/182 408/3 |
| 3,433,082 A | * | 3/1969 | Atkinson | ............... B25D 16/00 74/22 R |

(Continued)

FOREIGN PATENT DOCUMENTS

KR          10-1046681 B1      7/2011

*Primary Examiner* — Robert F Long
(74) *Attorney, Agent, or Firm* — McDonnell Boehnen Hulbert & Berghoff LLP

(57) ABSTRACT

A spindle apparatus according to the present disclosure includes a housing, a spindle rotatably installed in the housing, a tool releasably engaged with one end of the spindle and having an insert tip movable in a radial direction of the tool, a first draw-bar movably mounted in the spindle, and a second draw-bar movably mounted in the first draw-bar. The tool and one end of the first draw-bar are releasably engaged with the one end of the spindle by a movement of the first draw-bar, and the insert tip is configured to move in the radial direction by a movement of the second draw-bar.

16 Claims, 16 Drawing Sheets

(56) References Cited

U.S. PATENT DOCUMENTS

| | | | | |
|---|---|---|---|---|
| 3,724,237 | A * | 4/1973 | Wood | B23B 45/003 464/177 |
| 3,730,281 | A * | 5/1973 | Wood | B25D 16/00 173/48 |
| 3,731,562 | A * | 5/1973 | Heuser | B23B 29/03485 82/1.2 |
| 3,966,347 | A * | 6/1976 | Watson | B23B 29/03 408/180 |
| 4,024,778 | A * | 5/1977 | De Fauw | B23B 29/03446 82/158 |
| 4,047,829 | A * | 9/1977 | Benjamin | B23B 29/03446 408/169 |
| 4,128,043 | A * | 12/1978 | Grassl | B23B 31/265 279/109 |
| 4,273,483 | A * | 6/1981 | Mendicino | B27C 5/10 144/136.1 |
| 4,369,007 | A * | 1/1983 | Canady | B23B 51/05 279/6 |
| 4,451,185 | A * | 5/1984 | Yamakage | B23B 29/03446 408/12 |
| 4,590,827 | A * | 5/1986 | Wiltsie | B23B 29/03453 82/11 |
| 4,742,738 | A * | 5/1988 | Strand | B23B 5/38 408/161 |
| 4,759,245 | A * | 7/1988 | Schneider | B23B 29/03446 408/81 |
| 4,867,021 | A * | 9/1989 | Bogaerts | B23B 27/1651 82/112 |
| 4,884,481 | A * | 12/1989 | Strauss | B23B 29/03446 82/1.2 |
| 5,120,167 | A * | 6/1992 | Simpson | B23B 29/03446 408/153 |
| 5,342,155 | A * | 8/1994 | Harroun | B23B 31/006 408/240 |
| 5,775,853 | A * | 7/1998 | Keefer | B23B 31/261 408/1 R |
| 5,806,859 | A * | 9/1998 | Saccomanno | B23B 31/207 279/143 |
| 5,960,687 | A * | 10/1999 | Rohrberg | B21D 19/046 82/1.2 |
| 5,997,455 | A * | 12/1999 | Matsuoka | B23B 31/263 409/233 |
| 6,108,885 | A * | 8/2000 | Cox | B25B 27/0007 29/268 |
| 6,270,295 | B1 | 8/2001 | Hyatt et al. | |
| 6,331,093 | B1 | 12/2001 | Graham et al. | |
| 6,755,597 | B2 * | 6/2004 | Bergner | B23Q 7/10 144/136.95 |
| 7,249,919 | B2 * | 7/2007 | Dawidziak | B23B 31/265 408/239 R |
| 7,438,139 | B2 * | 10/2008 | Pillers, II | B25D 17/08 173/128 |
| 9,308,011 | B2 * | 4/2016 | Chao | A61B 17/00234 |
| 2001/0022920 | A1 * | 9/2001 | Hyatt | B23B 29/03432 408/1 R |
| 2003/0044252 | A1 * | 3/2003 | Landt | B25F 3/00 409/182 |
| 2003/0066667 | A1 * | 4/2003 | Zhang | B25F 3/00 173/217 |
| 2004/0184893 | A1 * | 9/2004 | Johne | B23C 5/06 408/156 |
| 2005/0166727 | A1 * | 8/2005 | Peltonen | B23B 29/03403 82/1.11 |
| 2008/0121078 | A1 * | 5/2008 | Kunimatsu | B23B 1/00 83/13 |
| 2009/0209184 | A1 * | 8/2009 | Esenwein | B24B 23/028 451/451 |
| 2013/0205604 | A1 * | 8/2013 | Esenwein | B24B 23/028 30/388 |
| 2015/0115554 | A1 * | 4/2015 | Tussing | B25F 3/00 279/140 |
| 2015/0273591 | A1 * | 10/2015 | Nakamura | B23B 29/03446 408/158 |

* cited by examiner ered. The coupling protrusions of the shank holder may be inserted into the coupling grooves of the shank. The coupling protrusions of the shank and the coupling protrusions of the shank holder may be axially coupled together by the rotation of the adjustment member.
SPINDLE APPARATUS AND OPERATING METHOD THEREOF

CROSS-REFERENCE TO RELATED APPLICATION

This application is based on and claims the benefit of priority to Korean Patent Application No. 10-2017-0066214, filed on May 29, 2017, in the Korean Intellectual Property Office, the disclosure of which is incorporated herein in its entirety by reference.

TECHNICAL FIELD

The present disclosure relates to a spindle apparatus. More specifically, the present disclosure relates to a spindle apparatus of a machine tool and an operating method thereof.

BACKGROUND

A spindle apparatus includes a rotatable spindle, a driver configured to operate the spindle, and a housing configured to support the spindle and the driver. A tool, such as a drill, a boring tool or other cutting tool, is clamped on an end portion of the spindle by a tool holder.

The spindle apparatus may be applied to a machine tool, such as a machining center, to machine a workpiece by cutting, boring, grinding, shearing, or the like. A cutting tool is mounted at an end portion of the spindle apparatus.

The discussions of this section are to provide background of the invention. Applicant notes that this section may contain information available before this application. However, by providing this section, Applicant does not admit that any information contained in this section constitutes prior art.

SUMMARY

An aspect of the present disclosure provides a spindle apparatus that may adjust the position of an insert tip along the radial direction of a tool, thereby varying the tool radius.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a spindle apparatus may include a housing, a spindle rotatably installed in the housing, a tool releasably engaged with one end of the spindle and having an insert tip movable in a radial direction of the tool, a first draw-bar movably mounted in the spindle, and a second draw-bar movably mounted in the first draw-bar. The tool and one end of the first draw-bar may be releasably engaged with the one end of the spindle by a movement of the first draw-bar. The insert tip may be configured to move in the radial direction by a movement of the second draw-bar.

The tool may have a first passage formed in the radial direction and a second passage famed in an axial direction of the tool. The insert tip may be mounted in the first passage to move along the radial direction of the tool. An adjustment member may be mounted in the second passage to move along the axial direction of the tool. The adjustment member may be removably coupled to one end of the second draw-bar.

The adjustment member may be configured to move along the second passage of the tool by the movement of the second draw-bar. The insert tip may be configured to move along the first passage of the tool by the movement of the adjustment member.

The insert tip may have a first inclined surface, and the adjustment member may have a second inclined surface making contact with the first inclined surface.

The adjustment member may have a shank, and a shank holder may be formed on the one end of the second draw-bar. The shank and the shank holder may be removably coupled together by rotation of the adjustment member.

The shank may have one or more coupling grooves and coupling protrusions formed on an outer surface of the shank to follow each other in series along an axial direction of the shank. The shank holder may have one or more coupling protrusions formed on an inner surface of the shank holder.

A collet may be mounted in the one end of the spindle. The collet may be configured to expand or contract in the radial direction by the movement of the first draw-bar to clamp the one end of the first draw-bar.

A clamp may be disposed around the collet and may engage the tool and the one end of the spindle in a lengthwise direction.

The clamp may have one or more tapered surfaces formed on an inner surface of the clamp, and the collet may have one or more tapered surfaces formed on an outer surface of the collet. The tapered surfaces of the collet and the tapered surfaces of the clamp may be separably coupled together.

The first draw-bar may be configured to move along a first direction by a piston and to move along a second direction by an elastic member. The first direction and the second direction may be opposite to each other.

The second draw-bar may be configured to move along first and second directions by an actuator.

The actuator may include a drive motor, a lead screw connected to the drive motor, and a nut mounted on an outer surface of the lead screw to perform a screw motion. The nut may be secured to the housing. The drive motor may be connected to the second draw-bar. The second draw-bar may be configured to move together with the drive motor as the lead screw rotates by operating the drive motor.

The second draw-bar may be released from or coupled with the spindle by a clutch unit in a rotational direction.

The clutch unit may include a first clutch member coupled to the second draw-bar, a second clutch member secured to the spindle, a clutch cap secured to the first clutch member, and one or more coupling members configured to removably couple the clutch cap and the second clutch member.

According to another aspect of the present disclosure, provided is a method for operating a spindle apparatus that includes a spindle rotatably installed in a housing, a tool releasably engaged with one end of the spindle by a clamp and a collet, a first draw-bar movably mounted in the spindle, a second draw-bar movably mounted in the first draw-bar, a clutch unit configured to release or couple the second draw-bar and the spindle according to a rotational direction, and an insert tip configured to move in a radial direction of the tool.

The method include engaging the tool and one end of the first draw-bar with the one end of the spindle by moving the first draw-bar in a first direction, and moving the insert tip in the radial direction of the tool by moving the second draw-bar in the first direction or in a second direction. The first direction and the second direction may be opposite to each other in a lengthwise direction of the spindle.

The tool and the one end of the first draw-bar may be disengaged from the one end of the spindle by moving the first draw-bar in the second direction.

The second draw-bar may be connected to the tool by releasing the second draw-bar and the spindle in the rotational direction by releasing the clutch unit.

According to embodiments of the present disclosure, a tool radius may be varied by adjusting the position of an insert tip along the radial direction of the tool. By varying the tool radius as described above, it is possible to flexibly respond to composite processes, such as boring an engine cylinder, line-boring or facing a crank bore of a cylinder block, boring a valve seat and a guide of a cylinder, and the like, in which the radius of a workpiece varies during an operation.

BRIEF DESCRIPTION OF THE DRAWINGS

The above and other aspects, features, and advantages of the present disclosure will be more apparent from the following detailed description taken in conjunction with the accompanying drawings:

FIG. 15 illustrates a state in which a first clutch member and a clutch cap are coupled together; FIG. 16 illustrates a state in which the first clutch member and the clutch cap are released from each other.

DETAILED DESCRIPTION

Figure 1:
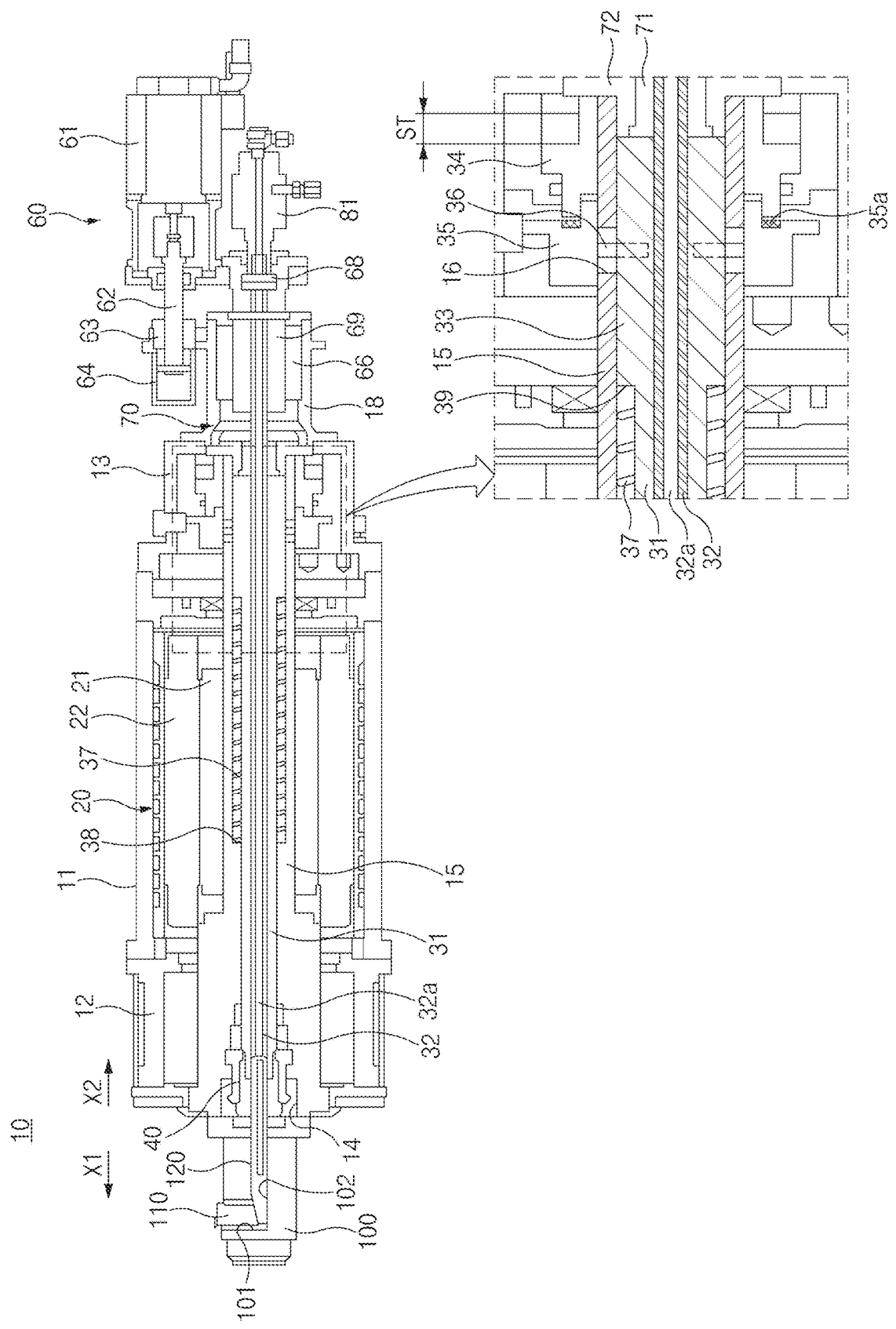
FIG. 1 is a side sectional view of a spindle apparatus according to an embodiment of the present disclosure.

Hereinafter, embodiments of the present disclosure will be described in detail with reference to the accompanying drawings. In the drawings, widths, lengths, and the like of elements and thickness of lines may be exaggerated for ease of understanding. In addition, terms used herein have been defined in consideration of the functions in the present disclosure, and may be changed depending on the intention or custom of users or operators. Therefore, the terms are to be defined based on the contents over the whole present specification.

Terms, such as "first", "second", "A", "B", "(a)", "(b)", and the like, may be used herein to describe elements of the present disclosure. Such terms are only used to distinguish one element from another element, and the substance, sequence, order, or number of these elements is not limited by these terms. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

A typical spindle apparatus has a disadvantage in that a tool with a predetermined outer diameter is removably engaged with an end portion of a spindle, and therefore the tool has to be frequently replaced to machine an irregular shape (e.g., a portion with a varying radius along the lengthwise direction) in a cylinder block, a cylinder head, and the like of an engine, thereby causing a deterioration in workability.

Furthermore, the typical spindle apparatus grips only a tool with a predetermined outer diameter at the end portion of the spindle so that the spindle apparatus may not be flexible in responding to composite machining processes.

Referring to FIG. 1, a spindle apparatus 10 according to an embodiment of the present disclosure may include a housing 11, a spindle 15 rotatably installed in the housing 11, a tool 100 releasably engaged with one end of the spindle 15, a first draw-bar 31 movably installed in the spindle 15, a second draw-bar 32 movably installed in the first draw-bar 31, and a spindle motor 20 configured to operate the spindle 15.

A first cover 12 may be installed on one end of the housing 11, and a second cover 13 may be installed on an opposite end of the housing 12.

The spindle 15 may be rotatably mounted in the housing 11 and may be rotatably supported by a plurality of bearings within the housing 11.

The spindle 15 may be rotated in the housing 11 by the spindle motor 20, and the spindle motor 20 may include a rotor 21 secured to an outer surface of the spindle 15 and a stator 22 secured to an inner surface of the housing 11.

The tool 100 may have a first passage 101 and a second passage 102 formed therein. The first passage 101 may extend along a radial direction of the tool 100, and the second passage 102 may extend along an axial direction of the tool 100. An insert tip 110 may be mounted in the first passage 101 of the tool 100 to move along the radial direction of the tool 100, and an adjustment member 120 may be mounted in the second passage 102 of the tool 100 to move along the axial direction of the tool 100. The adjustment member 120 may have a key 105 on an outer surface thereof, and the second passage 102 may have a keyway 106 extending along the axial direction of the tool 100. The key 105 of the adjustment member 120 may be guided along the keyway 106 of the second passage 102, and the adjustment member 120 may slide on the second passage 102 along the axial direction of the tool 100. Further, the key 105 may be configured to prevent the adjustment member 120 and the tool 100 from rotating relative to each other and to transmit torque, and thus the adjustment member 120 may rotate together with the tool 100 in the same direction.

A cutting blade 111 may be removably mounted on an outer end of the insert tip 110, and a first inclined surface 112 may be formed on an inner end of the insert tip 110.

The adjustment member 120 may have a second inclined surface 122 formed on one end thereof, and the second inclined surface 122 of the adjustment member 120 may make contact with the first inclined surface 112 of the insert tip 110. Accordingly, as the adjustment member 120 moves along the axial direction of the tool 100, the first inclined surface 112 of the insert tip 110 may move along the second inclined surface 122 of the adjustment member 120, and thus the insert tip 110 may move in the radial direction of the tool 100.

The adjustment member 120 may have a shank 121 formed on an opposite end thereof. The shank 121 of the adjustment member 120 may have an outer diameter smaller than the outer diameter of the adjustment member 120 and may extend from the opposite end of the adjustment member 120 toward the second draw-bar 32 by a predetermined length.

Figure 4:
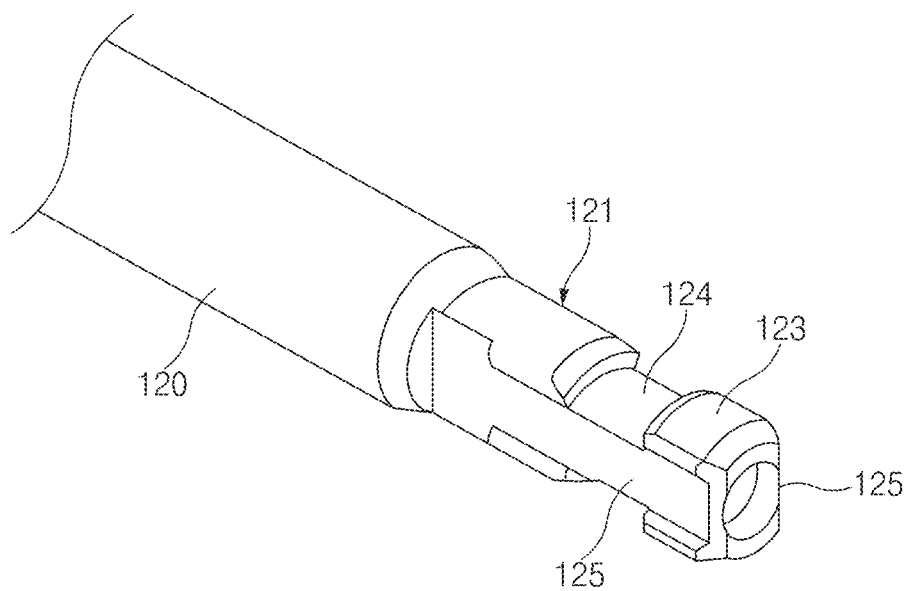
FIG. 4 is a partial perspective view of an adjustment member of the spindle apparatus, according to an embodiment of the present disclosure.
Figure 5:
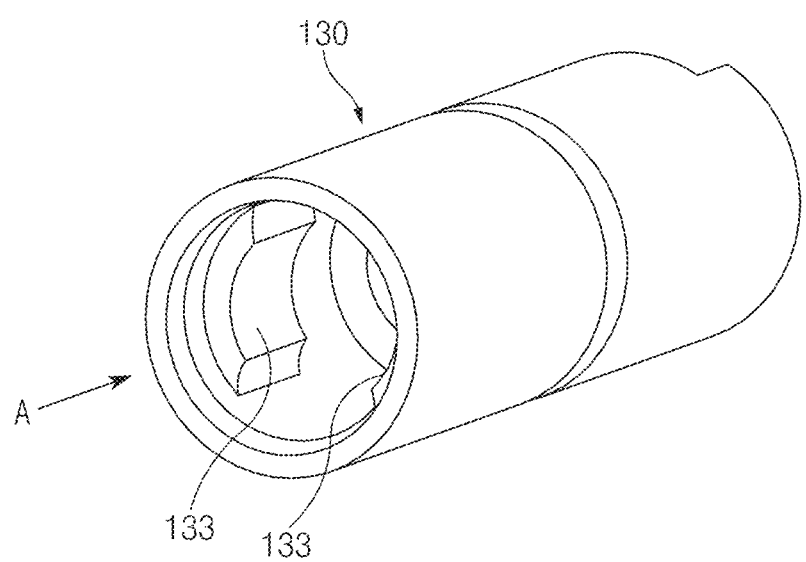
FIG. 5 is a perspective view of a shank holder of the spindle apparatus, according to an embodiment of the present disclosure.
Figure 6:
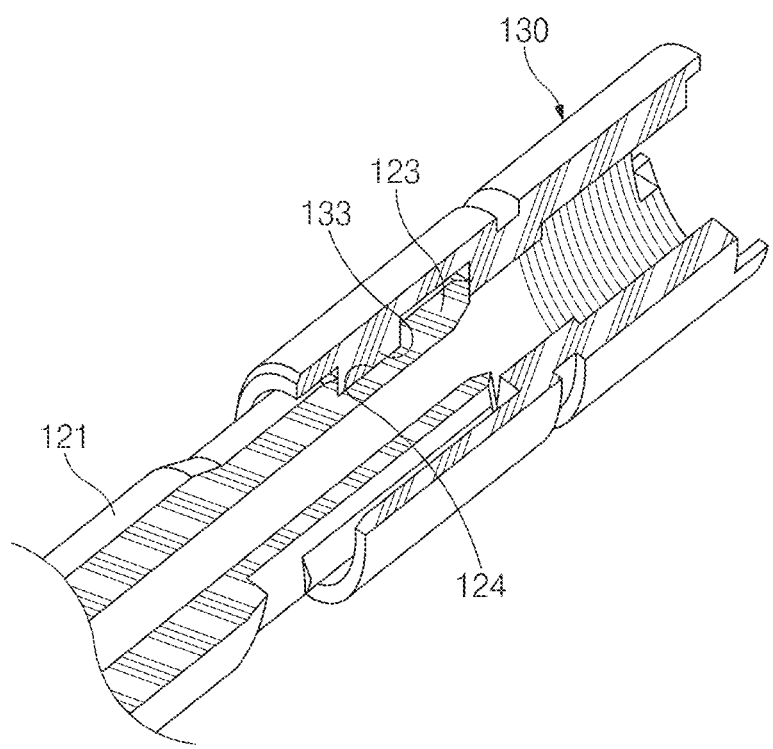
FIG. 6 is a partially cutaway perspective view illustrating a state in which a shank of the adjustment member and the shank holder are coupled together in the spindle apparatus, according to an embodiment of the present disclosure.

As illustrated in FIG. 4, the shank 121 may have one or more coupling protrusions 123 and coupling grooves 124, and the coupling protrusions 123 and the coupling grooves 124 may be formed to follow each other in series along the axial direction of the shank 121. As illustrated in FIGS. 7 to 10, the plurality of coupling protrusions 123 may be formed to be circumferentially spaced apart from each other, and a pair of flat surfaces 125 may be formed on opposite sides of the shank 121 so as to be parallel to each other.

The shank 121 of the adjustment member 120 may be removably coupled to one end of the second draw-bar 32. As the second draw-bar 32 moves along the lengthwise direction, the adjustment member 120 may move within the second passage 102 of the tool 100 along the axial direction. Due to the movement of the adjustment member 120, the insert tip 110 may move within the first passage 101 of the tool 100 along the radial direction.

A clamp 40 and a collet 50 may be mounted in the one end of the spindle 15, and the tool 100 and one end of the first draw-bar 31 may be removably engaged with the one end of the spindle 15 by the clamp 40 and the collet 50.

The clamp 40 and the collet 50 may be configured to removably engage the tool 100 and the one end of the first draw-bar 31 with the one end of the spindle 15 by a movement of the first draw-bar 31.

Figure 2:
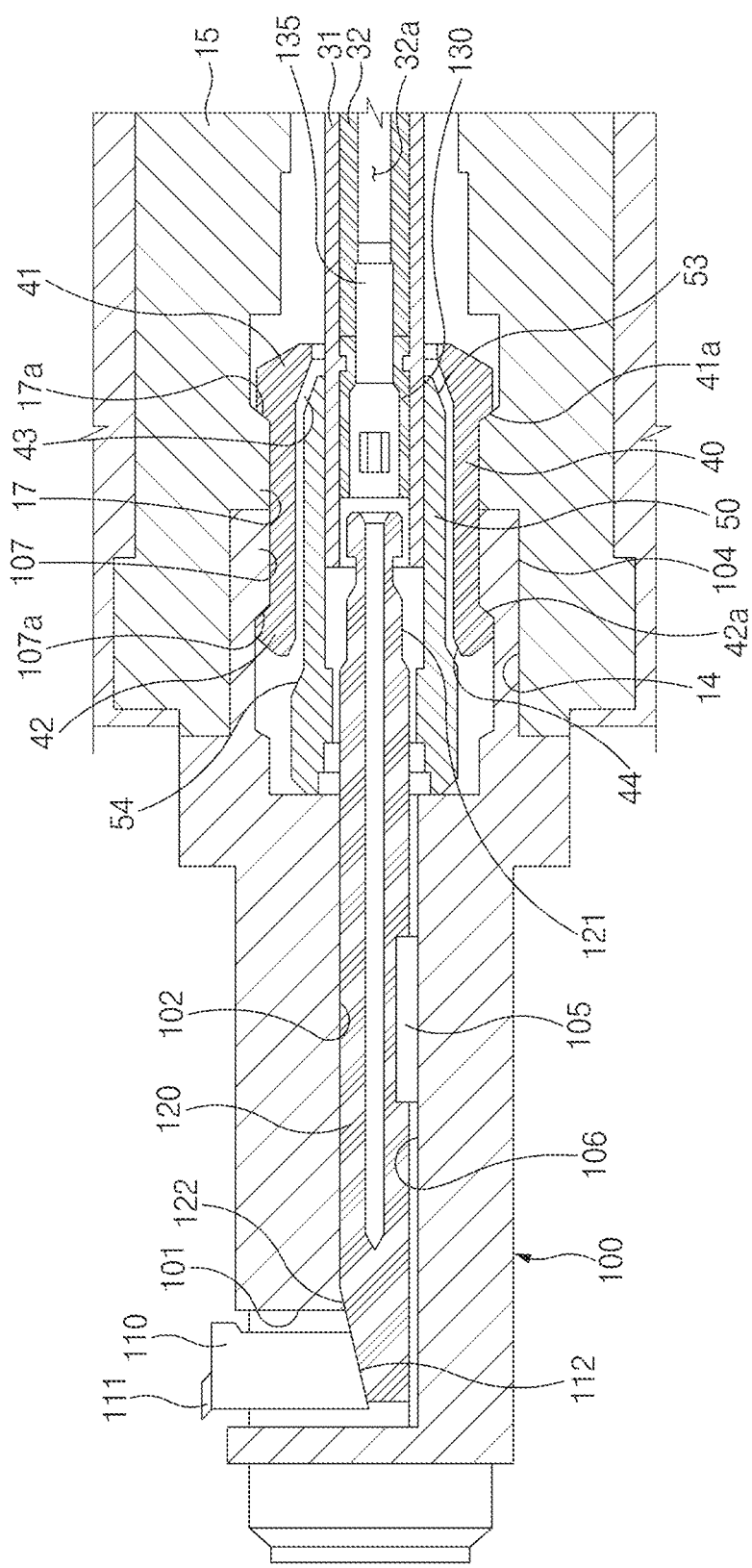
FIG. 2 illustrates a state before a collet in one end of a spindle of FIG. 1 grips one end of a first draw-bar.
Figure 3:
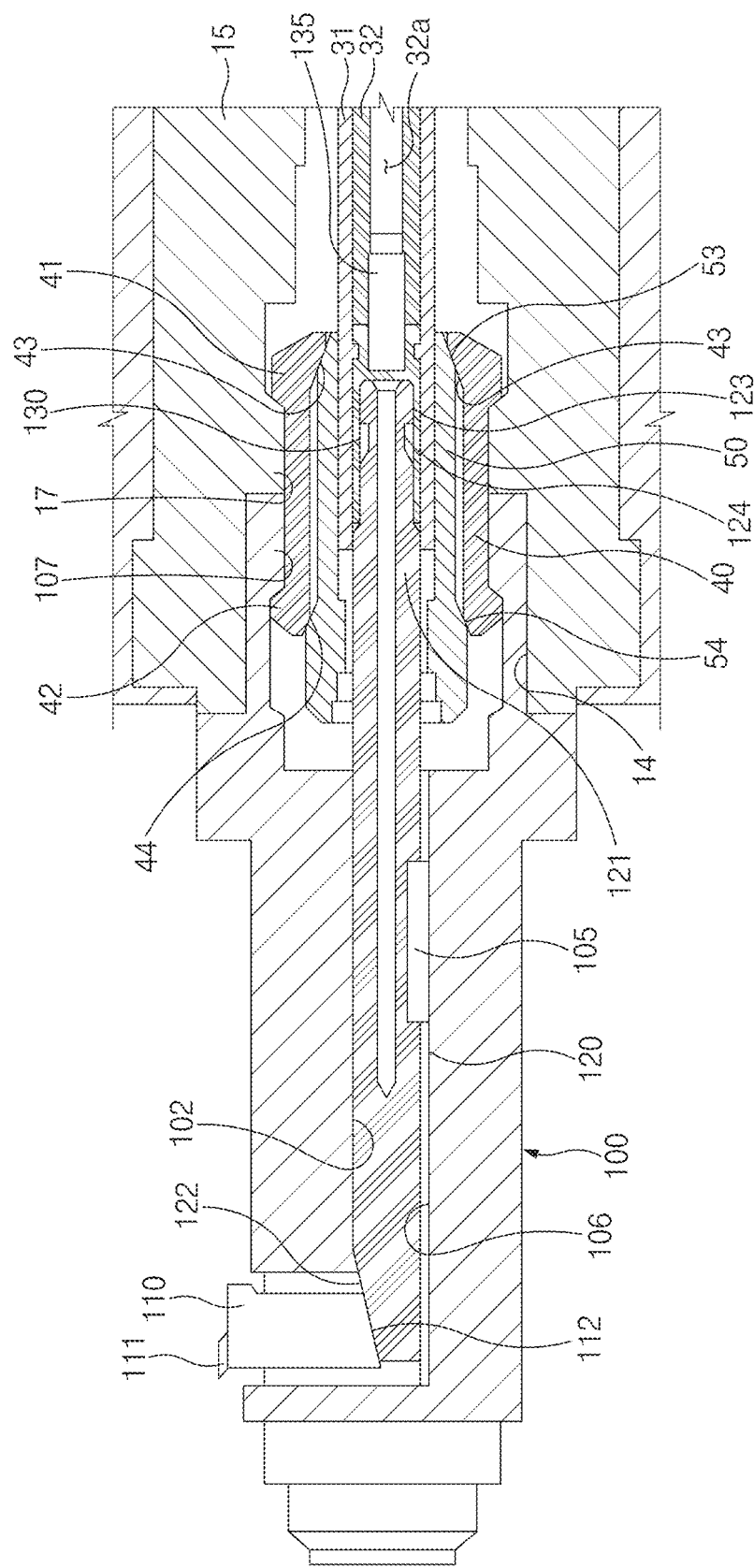
FIG. 3 illustrates a state in which the collet in the one end of the spindle of FIG. 1 grips the one end of the first draw-bar.

As illustrated in FIGS. 1 to 3, a mounting hole 14 may be formed in the one end of the spindle 15, and a protrusion 17 may protrude radially inward from an inner surface of the mounting hole 14. The tool 100 may have a sleeve 104 inserted into the mounting hole 14 of the spindle 15, and a protrusion 107 may protrude radially inward from an inner surface of the sleeve 104. The protrusion 17 of the spindle 15 and the protrusion 107 of the tool 100 may be engaged with each other by the clamp 40.

The clamp 40 may be disposed on the inner surface of the mounting hole 14 and the inner surface of the sleeve 104, and the collet 50 may be disposed inside the clamp 40. The mounting hole 14, the sleeve 104, the clamp 40, and the collet 50 may have the same axis.

The clamp 40 may have an elongated cylindrical shape. The clamp 40 may have two protrusions 41 and 42 protruding radially outward from an outer surface thereof, and the two protrusions 41 and 42 may be spaced apart from each other in the lengthwise direction of the clamp 40. The respective protrusions 41 and 42 may be separately engaged with the protrusion 17 of the spindle 15 and the protrusion 107 of the tool 100. As a result, the protrusion 17 of the spindle 15 and the protrusion 107 of the tool 100 may be engaged with each other in the axial direction.

The protrusions 41 and 42 of the clamp 40, the protrusion 17 of the spindle, and the protrusion 107 of the tool 100 may have tapered surfaces mutually corresponding to each other, and thus the protrusions 41 and 42 of the clamp 40 may be tightly engaged with the protrusion 17 of the spindle 15 and the protrusion 107 of the tool 100.

The clamp 40 may have one or more tapered surfaces 43 and 44 formed on the inner surface thereof. According to an embodiment, as illustrated in FIGS. 2 and 3, the clamp 40 may have two tapered surfaces 43 and 44 formed on the inner surface thereof, and the two tapered surfaces 43 and 44 may be spaced apart from each other in the lengthwise direction of the clamp 40.

The collet 50 may expand or contract along the radial direction to clamp the one end of the first draw-bar 31.

According to an embodiment, the collet 50 may have a cylindrical shape with one or more slots extending along the lengthwise direction. Accordingly, the collet 50 may expand or contract along the radial direction.

According to another embodiment, the collet 50 may be constituted by a plurality of segments divided from one another in the circumferential direction. Accordingly, the collet 50 may expand or contract along the radial direction.

The clamp 50 may have one or more tapered surfaces 53 and 54 formed on the outer surface thereof. According to an embodiment, as illustrated in FIGS. 2 and 3, the collet 50 may have two tapered surfaces 53 and 54 formed on the outer surface thereof, and the two tapered surfaces 53 and 54 may be spaced apart from each other by a distance corresponding to the distance between the tapered surfaces 43 and 44 of the clamp 40. The tapered surfaces 53 and 54 of the collet 50 may be separably engaged with the respective tapered surfaces 43 and 44 of the clamp 40 by a movement of the first draw-bar 31.

FIG. 2 illustrates a state in which the sleeve 104 of the tool 100 and the one end of the first draw-bar 31 are not engaged with the one end of the spindle 15. As illustrated in FIG. 2, if the first draw-bar 31 moves (advances) in a first direction (the direction X1 in FIG. 1), the collet 50 may move in the first direction X1 and may expand in the radial direction such that the one end of the first draw-bar 31 may be released from the inner surface of the collet 50.

FIG. 3 illustrates a state in which the sleeve 104 of the tool 100 and the one end of the first draw-bar 31 are engaged with the one end of the spindle 15. As illustrated in FIG. 3, if the first draw-bar 31 moves (retreats) in a second direction (the direction X2 in FIG. 1), the collet 50 may move together with the first draw-bar 31 in the second direction X2, and the tapered surfaces 53 and 54 of the collet 50 may be tightly engaged with the respective tapered surfaces 43 and 44 of the clamp 40. Accordingly, the collet 50 may contract in the radial direction to grip the one end of the first draw-bar 31. When the tapered surfaces 43 and 44 of the clamp 40 are engaged with the tapered surfaces 53 and 54 of the collet 50, as described above, the clamp 40 may press the outer surface of the collet 50, and the collet 50 may press the inner surface of the clamp 40. In embodiments, when the first draw-bar 31 moves (retreats) in the second direction X2, a repulsive force may be produced between the clamp 40 and the collet 50 such that the collet 50 may tightly grip the one end of the first draw-bar 31, and the protrusions 41 and 42 of the clamp 40 may engage the protrusion 17 of the spindle 15 with the protrusion 107 of the tool 100 along the axial direction of the clamp 40.

As illustrated in FIG. 1, the first direction X1 and the second direction X2 may be opposite to each other in the lengthwise direction of the spindle 15.

The first draw-bar 31 may be displaced (moved forward) by a piston 34 along the first direction X1, and the piston 34 may be air-tightly installed in an internal space defined by the second cover 13 of the housing 11. The piston 34 may be reciprocated by a predetermined range ST by hydraulic pressure applied to the internal space of the second cover 13 of the housing 11, and may be installed to move along the outer surface of the spindle 15.

One or more push members 35 connected with the first draw-bar may be located on the outer surface of the spindle 15, and coupling pins 36 may be coupled between the push members 35 and the first draw-bar 31. Slots 16 may be formed lengthwise through the parts of the spindle 15 on which the push members 35 are located, and the coupling pins 36 may connect the push members 35 and the first draw-bar 31 while passing through the slots 16. Accordingly, as the coupling pins 36 move along the lengthwise direction of the slots 16, the push members 35 may move together with the first draw-bar 31.

The push members 35 may be located in front of the piston 34 in the first direction X1, and the piston 34 may be configured to push the push members 35 in the first direction X1. The push members 35 may have buffer pads 35a, and the buffer pads 35a may reduce a shock applied to the piston 34 and the push members 35 when the piston 34 pushes the push members 35. If the piston 34 pushes the push members 35 in the first direction X1, the first draw-bar 31 connected to the push members 35 may move in the first direction X1, and as illustrated in FIG. 2, the one end of the first draw-bar 31 and the tool 100 may be disengaged from the one end of the spindle 15.

The length of the slots 16 may be greater than the diameter of the coupling pins 36 to regulate the moving distance of the first draw-bar 31, and the width of the slots 16 may be configured to correspond to the diameter of the coupling pins 36. Accordingly, while the coupling pins 36 are moving along the lengthwise direction of the slots 16, the spindle 15 and the first draw-bar 31 may not interfere with each other in the lengthwise direction. However, since the width of the slots 16 corresponds to the diameter of the coupling pins 36, the coupling pins 36 may prevent the spindle 15 and the first draw-bar 31 from rotating relative to each other. As a result, when the spindle 15 rotates, the first draw-bar 31 may rotate together with the spindle 15.

The first draw-bar 31 may be installed so as to be movable by an elastic member 37 along the second direction X2. A first step 38 may be formed on the inner surface of the spindle 15, and a second step 39 may be formed on the outer surface of the first draw-bar 31. The first step 38 and the second step 39 may be spaced apart from each other in the lengthwise direction of the housing 11. The elastic member 37 may be installed between the first step 38 and the second step 39. Since the spindle 15 does not move along the lengthwise direction of the housing 11, but the first draw-bar 31 is movable along the lengthwise direction of the housing 11, the elastic member 37 may apply an elastic force to the first draw-bar 31 to push the first draw-bar 31 in the second direction X2. Accordingly, if hydraulic pressure is not applied to the internal space of the second cover 12 of the housing 11, the piston 34 may stop, and the first draw-bar 31 may be displaced by the elastic force of the elastic member 37 along the second direction X2. Thus, as illustrated in FIG. 3, the collet 50 may grip the one end of the first draw-bar 31, and the one end of the first draw-bar 31 and the sleeve 104 of the tool 100 may be coupled to the mounting hole 14 of the spindle 15.

The first draw-bar 31 may have a large-diameter portion 33 formed on an opposite end thereof, and the large-diameter portion 33 may have a larger outer diameter than the first draw-bar 31. The second step 39 may be formed on the opposite end of the first draw-bar 31 by the large-diameter portion 33. Accordingly, the elastic member 37 may apply an elastic force to the large-diameter portion 33 of the first draw-bar 31 in the second direction X2, and thus the first draw-bar 31 may move along the second direction X2. The coupling pins 36 of the push members 35 may be coupled to the large-diameter portion 33.

The second draw-bar 32 may have an oil passage 32a through which oil, such as cutting oil, lubricant oil, or the like, is delivered, and the oil passage 32a may extend along the axial direction of the second draw-bar 32. An oil supply unit 81 (such as a rotary union) that supplies oil may be attached to an opposite end of the second draw-bar 32.

A shank holder 130 may be connected to the one end of the second draw-bar 32. The shank holder 130 may be removably coupled to the one end of the second draw-bar 32 through a connector 135.

The shank holder 130 may be implemented with a hollow cylinder, and one or more coupling protrusions 133 may be formed on an inner surface of the shank holder 130. As illustrated in FIGS. 7 to 10, the plurality of coupling protrusions 133 may be formed to be circumferentially spaced apart from each other, and the number of coupling protrusions 133 of the shank holder 130 may be the same as the number of coupling protrusions 123 of the shank 121.

The coupling protrusions 133 of the shank holder 130 may be rotatably inserted into the coupling grooves 124 of the adjustment member 120.

In the state in which the sleeve 104 of the tool 100 and the one end of the first draw-bar 31 are coupled to the mounting hole 14 of the spindle 15 by the clamp 40 and the collet 50, as illustrated in FIG. 3, the adjustment member 120 may rotate, and therefore the shank 121 of the adjustment member 120 and the shank holder 130 of the second draw-bar 32 may be removably coupled together.

Since the adjustment member 120 is engaged with the second passage 102 of the tool 100 by the key 105 along a rotational direction, the adjustment member 120 may rotate together with the tool 100 in the same direction when the tool 100 rotates together with the spindle 15. Since the adjustment member 120 rotates together with the spindle 15 and the tool 100, the shank 121 of the adjustment member 120 may rotate within the shank holder 130 of the second draw-bar 32, and thus the coupling protrusions 123 of the shank 121 and the coupling protrusions 133 of the shank holder 130 may be axially coupled together within the collet 50.

A process in which the shank 121 of the adjustment member 120 and the shank holder 130 of the second draw-bar 32 are coupled together will be described in detail with reference to FIGS. 7 to 9.

Figure 7:
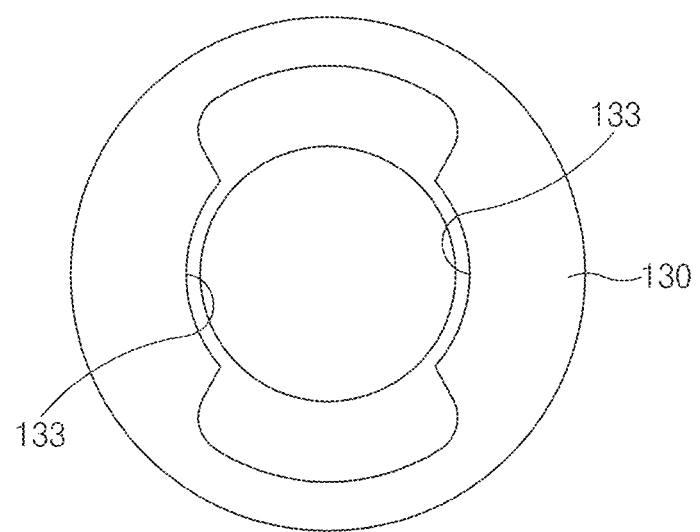
FIG. 7 is a front view of the shank holder when viewed in the direction of an arrow A in FIG. 5.

In an initial stage, the shank 121 of the adjustment member 120 and the shank holder 130 of the second draw-bar 32 may be spaced apart from each other, as illustrated in FIG. 7.

Figure 8:
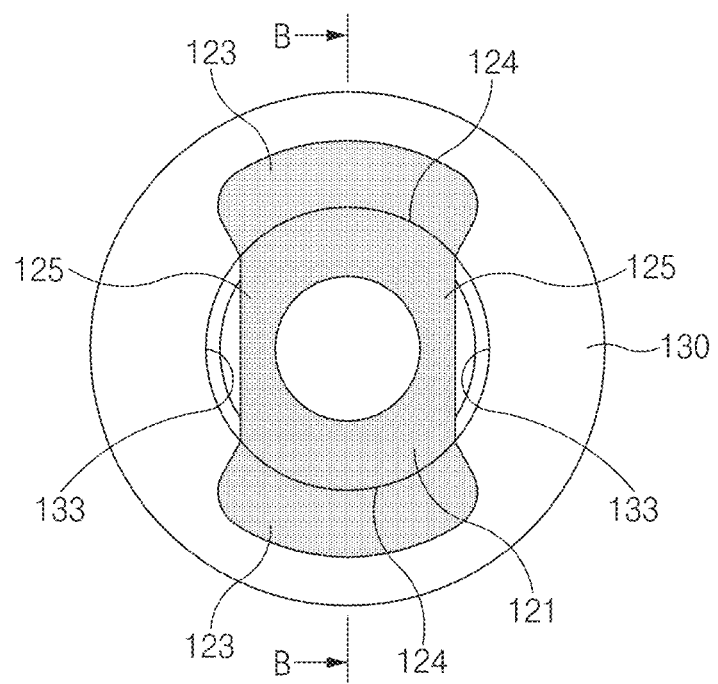
FIG. 8 illustrates a state in which the shank of the adjustment member is inserted into the shank holder of FIG. 7.
Figure 11:
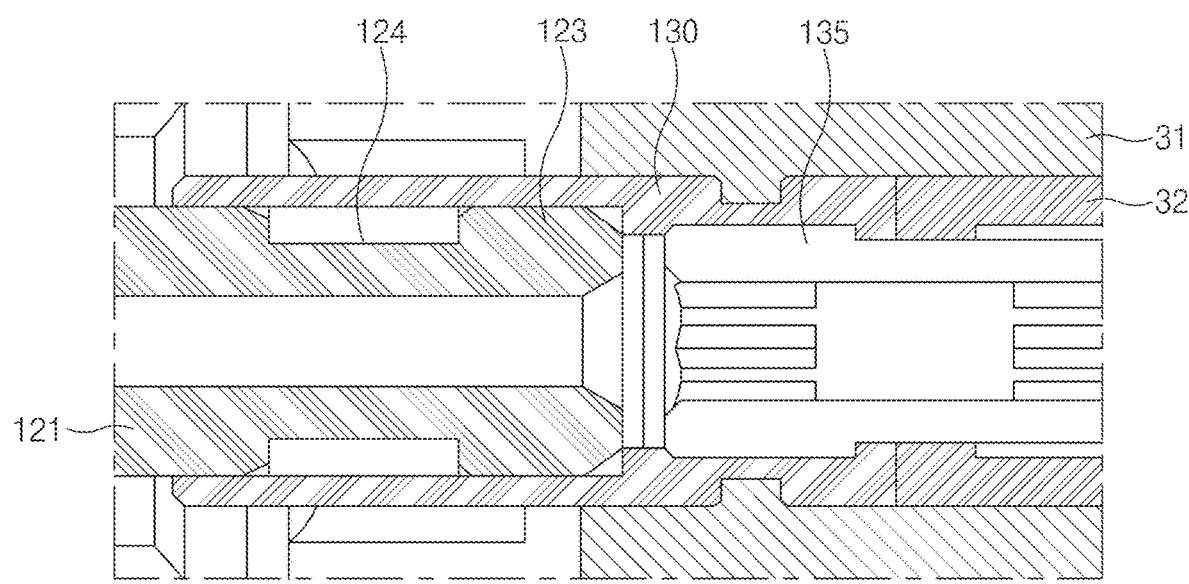
FIG. 11 is a sectional view taken along line B-B of FIG. 8.
Figure 12:
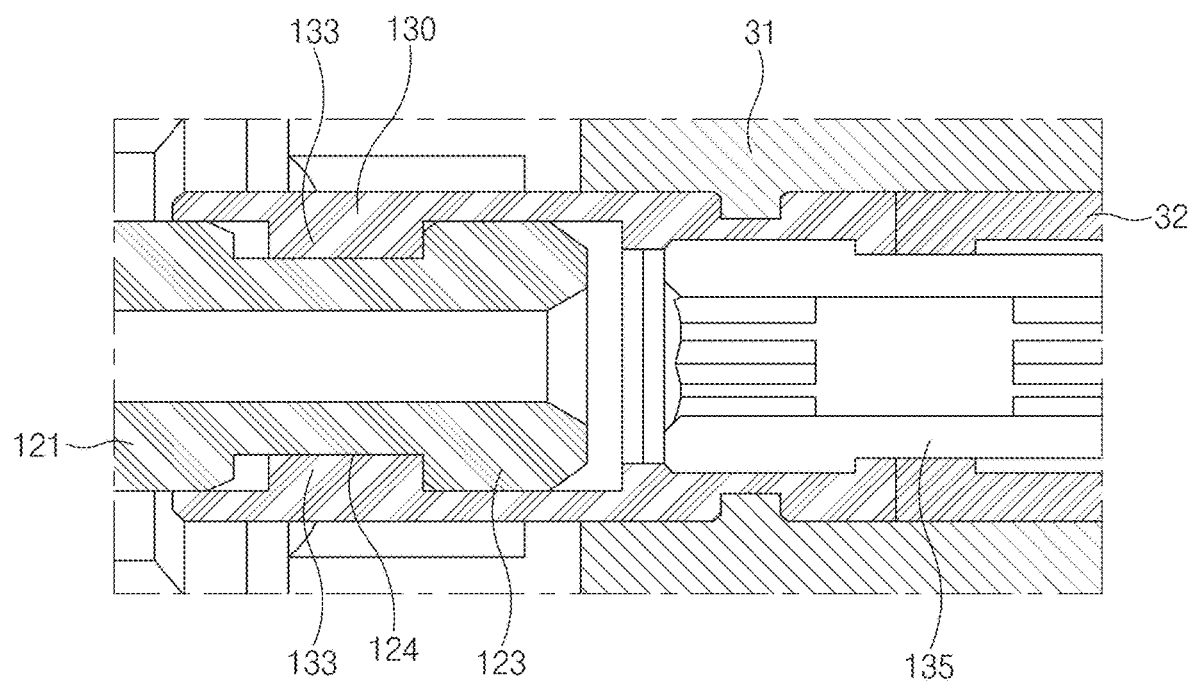
FIG. 12 is a sectional view taken along line C-C of FIG. 10.
Figure 13:
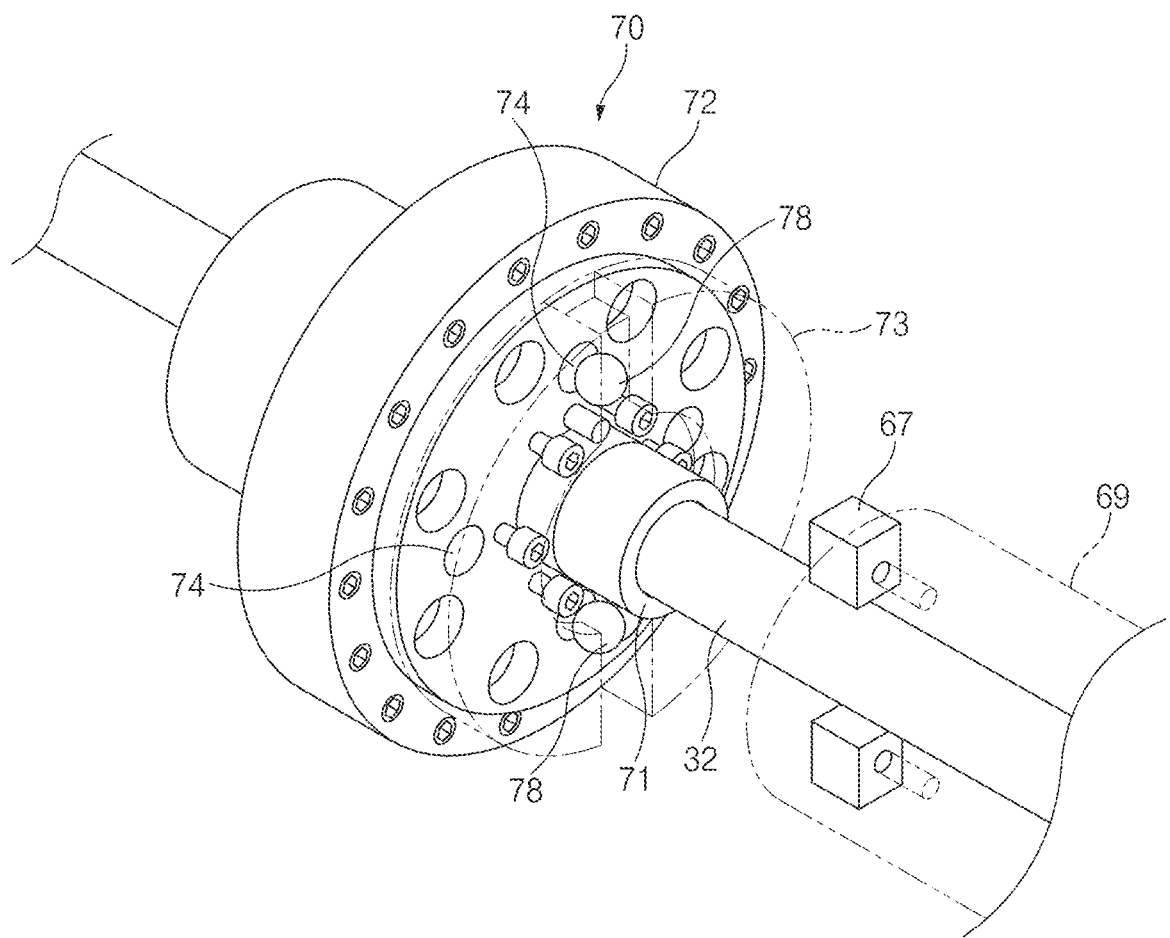
FIG. 13 is a partial perspective view of a clutch unit mounted on a second draw-bar in the spindle apparatus, according to an embodiment of the present disclosure.
Figure 14:
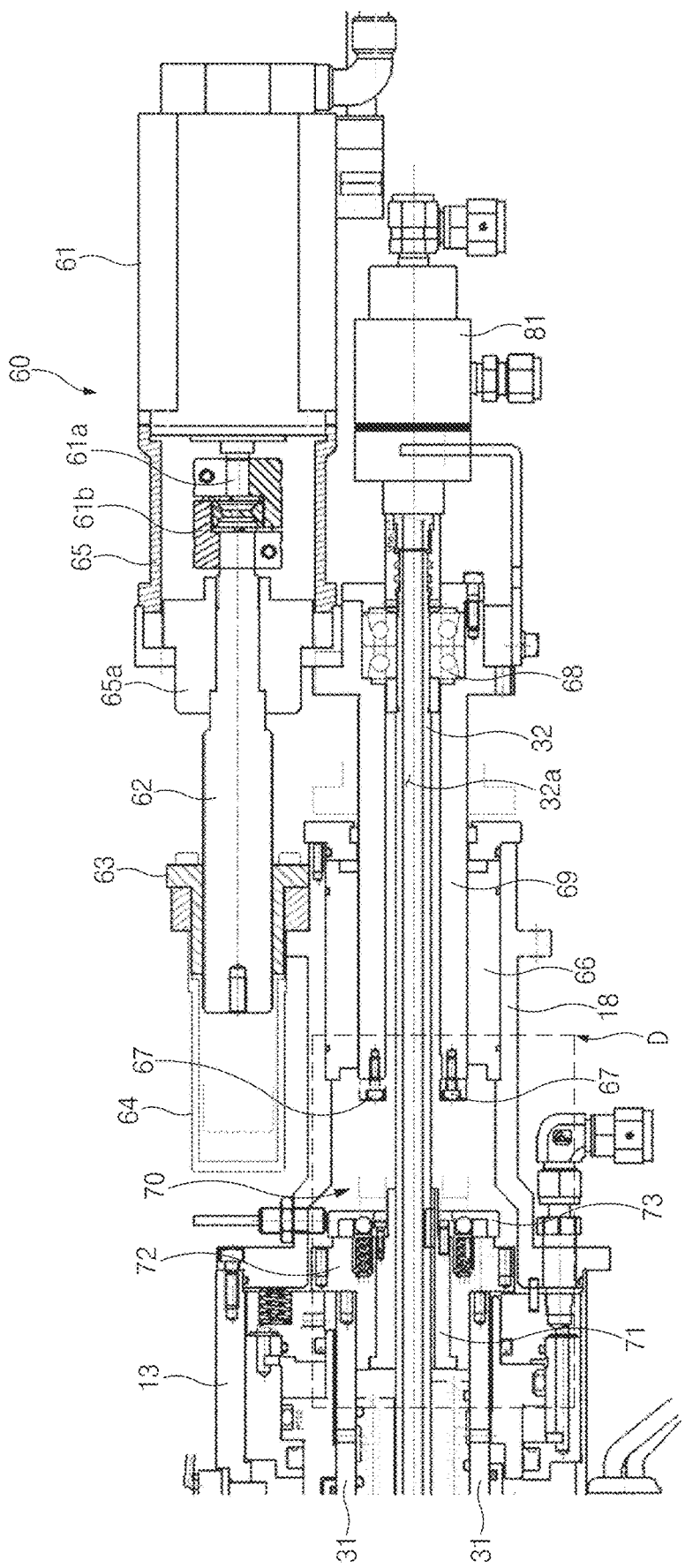
FIG. 14 is a partial side sectional view illustrating an actuator and the clutch unit of the spindle apparatus, according to an embodiment of the present disclosure.
Figure 15:
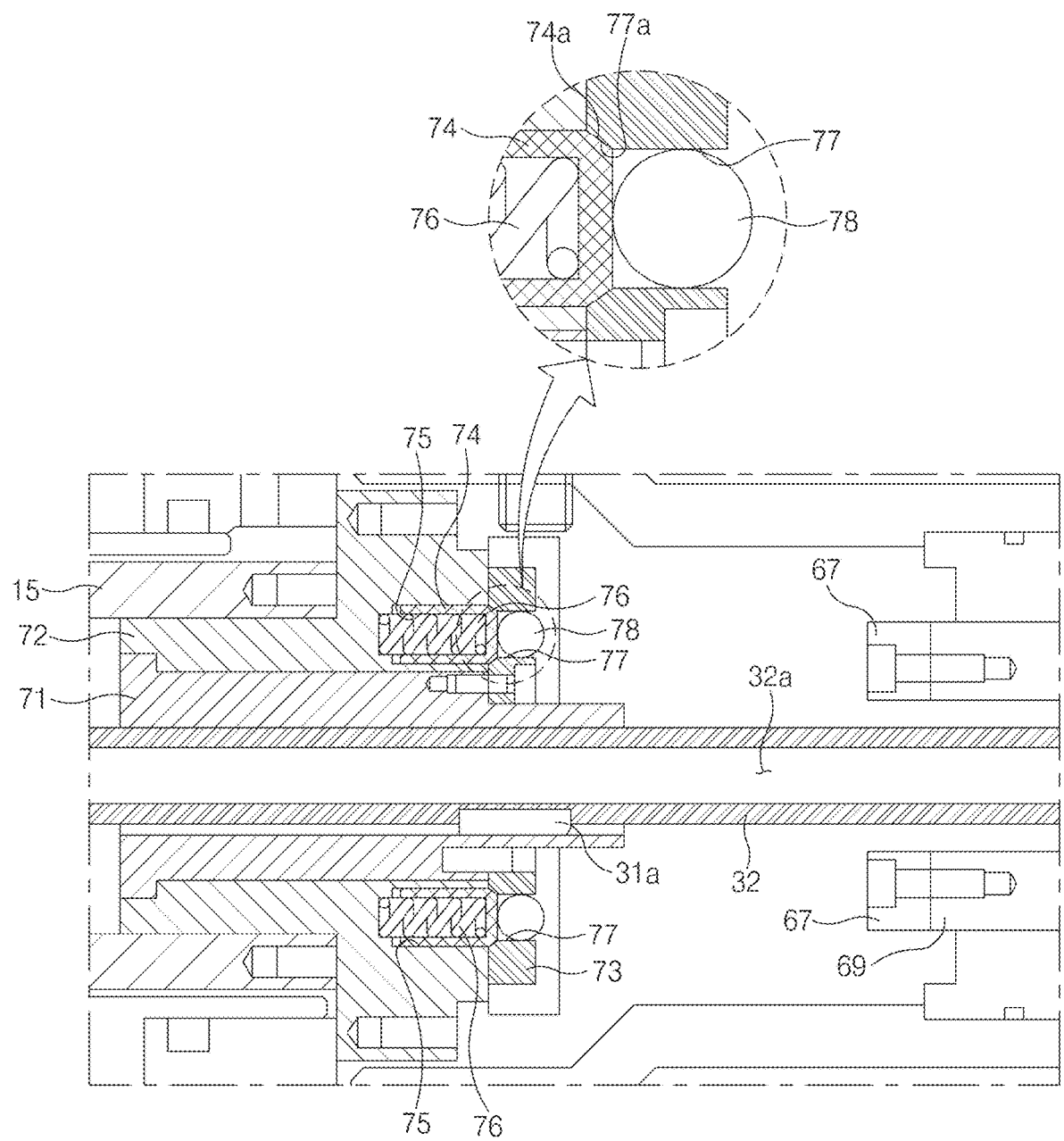
FIG. 15 is a blowup of detail D in FIG. 14, where
Figure 16:
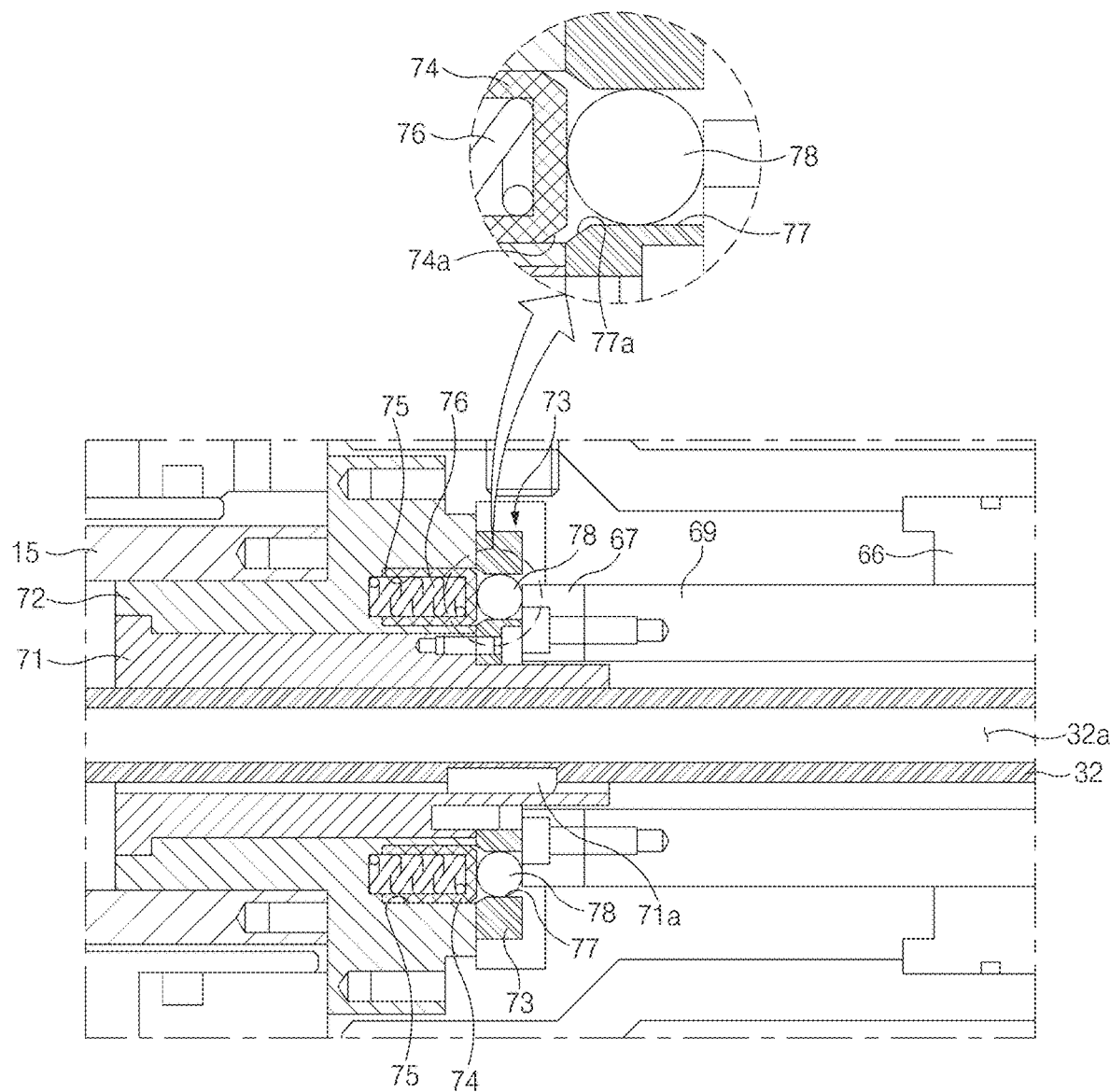
FIG. 16 is a blowup of detail D in FIG. 14, where

As illustrated in FIGS. 8 and 11, the coupling protrusions 133 of the shank holder 130 may be inserted into the coupling grooves 124 of the shank 121 when the second draw-bar 32 moves in the first direction X1. At this time, since the coupling protrusions 123 of the shank 121 are located at a release position P1 so as not to interfere with the coupling protrusions 133 of the shank holder 130, the coupling protrusions 133 of the shank holder 130 may be smoothly inserted into the coupling grooves 124 of the shank 121.

Figure 9:
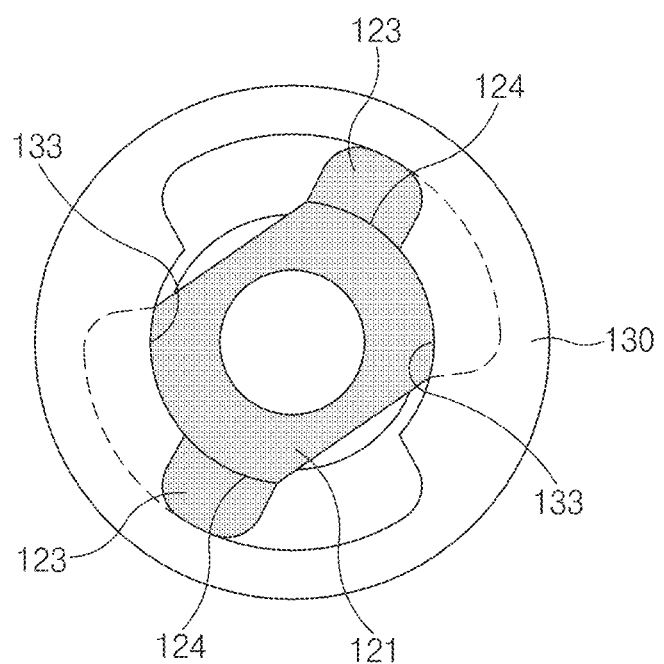
FIG. 9 illustrates a state in which the adjustment member inside the shank holder rotates toward a coupling position.
Figure 10:
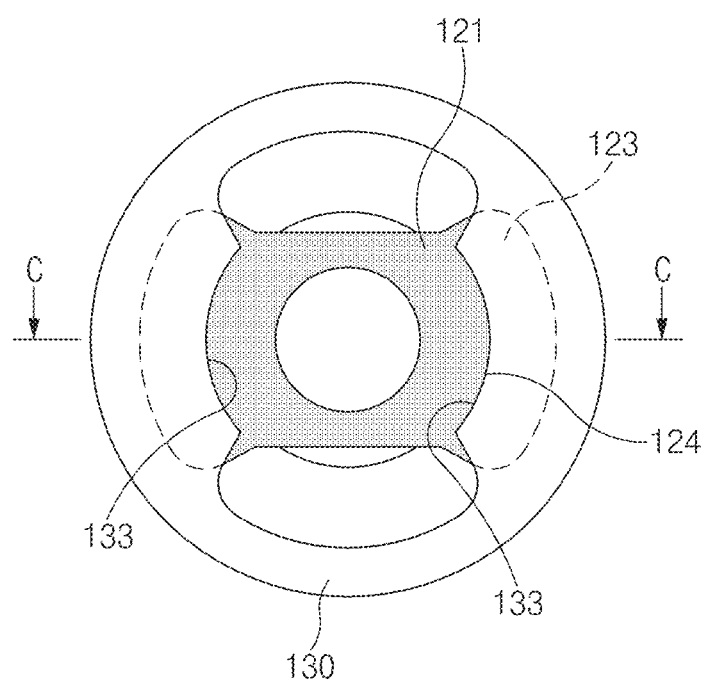
FIG. 10 illustrates a state in which coupling protrusions of the adjustment member are displaced to the coupling position inside the shank holder.

If the adjustment member 120 rotates at a predetermined angle, as illustrated in FIG. 9, and then moves to a coupling position P2 in which the coupling protrusions 123 of the adjustment member 120 and the coupling protrusions 133 of the shank holder 130 make surface-to-surface contact with each other, as illustrated in FIG. 10, the shank 121 of the adjustment member 120 and the shank holder 130 may be axially coupled together within the collet 50.

The second draw-bar 32 may be configured to move along the first direction X1 and the second direction X2 by an actuator 60.

The actuator 60 may include a drive motor 61, such as a servo-motor, and the drive motor 61 may be disposed adjacent to the second cover 13 of the housing 11. A bracket 18 may be attached to the second cover 13 of the housing 11.

A lead screw 62 may be connected to a shaft 61a of the drive motor 61 through a coupler 61b, and a nut 63 may be mounted on the outer surface of the lead screw 62 so as to perform a screw motion.

A cover 65 may be secured to one surface of the drive motor 61 to protect the shaft 61a and the lead screw 62, and a bush 65a may be attached to the cover 65 to rotatably support the lead screw 62.

The nut 63 may be secured to the bracket 18 and thus secured to a side of the second cover 13 of the housing 11, and a receiving body 64 may be attached to the nut 63 to receive a movement of the lead screw 62.

A connecting bracket 65c may be secured to the cover 65 of the drive motor 61, and an adjustment shaft 69 may be secured to the connecting bracket 65c. Accordingly, the drive motor 61, together with the adjustment shaft 69, may move in the same direction.

The adjustment shaft 69 may be a hollow shaft, and a portion of the second draw-bar 32 may be located within the hollow core of the adjustment shaft 69. A press-fit bearing 68 may be mounted between the inner surface of the adjustment shaft 69 and the outer surface of the second draw-bar 32, and thus the adjustment shaft 69 and the second draw-bar 32 may be connected with each other. An outer race of the press-fit bearing 68 may be press-fitted against the inner surface of the adjustment shaft 69, and an inner race of the press-fit bearing 68 may be press-fitted against the outer surface of the second draw-bar 32. As a result, the second draw-bar 32 and the adjustment shaft 69 may move together in the same direction along the lengthwise direction. The second draw-bar 32 may be rotatably supported by the press-fit bearing 68. A portion of the adjustment shaft 69 may be supported by a bearing or a bush 66 to rotate relative to the bracket 18, and the bearing or the bush 66 may be interposed between the inner surface of the bracket 18 and the outer surface of the adjustment shaft 69.

In regard to the above-configured actuator 60, if the drive motor 61 operates, the lead screw 62 may rotate relative to the nut 63 secured to the bracket 18 on the opposite end of the housing 11. Accordingly, the drive motor 61 and the cover 65 may move together in the first direction X1 or in the second direction X2, and the adjustment shaft 69 secured to the cover 65 and the second draw-bar 32 may move together in the first direction X1 or in the second direction X2.

A clutch unit 70 may be installed on the opposite end of the second draw-bar 32, and the second draw-bar 32 and the spindle 15 may be released from or coupled with each other by the clutch unit 70 in a rotational direction. If the second draw-bar 32 and the spindle 15 are coupled (engaged) with each other in the rotational direction by the clutch unit 70, the shank holder 130 connected to the one end of the second draw-bar 32 and the adjustment member 120 may rotate together with the spindle 15, and thus the shank holder 130 and the adjustment member 120 may not be coupled. In contrast, if the second draw-bar 32 and the spindle 15 are released (disengaged) from each other in the rotational direction by the clutch unit 70, the shank holder 130 connected to the one end of the second draw-bar 32 may not rotate together with the spindle 15, but the adjustment member 120 may rotate together with the spindle 15. Accordingly, the shank 121 of the adjustment member 120 may rotate within the shank holder 130 by the rotation of the spindle 15, and thus the shank 121 and the shank holder 130 may be coupled together in the lengthwise direction.

The clutch unit 70 may include a first clutch member 71 coupled to the second draw-bar 32, a second clutch member 72 secured to the spindle 15, a clutch cap 73 secured to the first clutch member 71, and one or more coupling members 74 that removably couples the clutch cap 73 and the second clutch member 72.

The first clutch member 71 may be connected to the outer surface of the second draw-bar 32 through a serration or a key 71a. Accordingly, the second draw-bar 32 may move on the inner surface of the first clutch member 71 along the axial direction, and the second draw-bar 32 and the first clutch member 71 may be coupled together in the rotational direction.

The second clutch member 72 may be secured to the opposite end of the spindle 15 through a fastener, and thus the second clutch member 72 may rotate together with the spindle 15 in the same direction.

The second clutch member 72 may have one or more first coupling recesses 75 in which the one or more coupling members 74 are movably received, and each coupling member 74 may be elastically supported by a spring 76 within each first coupling recess 75.

The clutch cap 73 may be secured to the first clutch member 71 through a fastener and may have second coupling recesses 77 to which end portions of the coupling members 74 are separably coupled.

According to an embodiment, each coupling member 74 may have a tapered surface 74a formed on the end portion thereof, and each second coupling recess 77 may have a tapered surface 77a to which the tapered surface 74a of the coupling member 74 is coupled. Accordingly, the coupling member 74 may be more firmly coupled to the second coupling recess 77.

Pressure objects 78 may be installed in the second coupling recesses 77 of the clutch cap 73 to press the end portions of the coupling members 74. The adjustment shaft 69 may move in the first direction X1 to push the pressure objects 78, and the pressure objects 78 may push the coupling members 74.

According to an embodiment, the pressure objects 78 may have a spherical shape and thus may stably press the end portions of the coupling members 74.

If the adjustment shaft 69 does not push the pressure objects 78, the end portions of the coupling members 74 may protrude from the first coupling recesses 75 by the elastic force of the springs 76 and may be inserted into the second coupling recesses 77 of the clutch cap 73, and thus the clutch cap 73 and the second clutch member 72 may be coupled together in the rotational direction.

If the adjustment shaft 69 pushes the pressure objects 78, the end portions of the coupling members 74 may move into the first coupling recesses 75, and the springs 76 may be compressed. Accordingly, the end portions of the coupling members 74 may be spaced apart from the second coupling recesses 77, and thus the clutch cap 73 and the second clutch member 72 may be released from each other in the rotational direction.

Pressing members 87 that press the pressure objects 78 may be coupled to an end portion of the adjustment shaft 69 through fasteners. The pressing members 67 may protrude from the end portion of the adjustment shaft 69.

In embodiments, a machine tool includes a spindle that generally extends along its rotational axis. The spindle is movable along and rotatable about the rotational axis. A cutting tool is attached to an end portion of the spindle. The cutting tool includes a tip for cutting a workpiece. For example, for boring a cylindrical hole of the workpiece (for example, cylinder block, cylinder head), the workpiece is fixed to the machine tool and the end portion of the spindle and the cutting tool are transferred to inside the cylindrical hole while the spindle is rotating about the rotational axis, thereby cutting the inner wall of the cylindrical hole.

In embodiments, a distance between the rotational axis to the tip of the cutting tool can be adjusted depending on the size of the cylindrical hole of the workpiece to be machined. For example, in a method of cutting inner walls of cylindrical holes, the inner wall of a first cylindrical hole of a workpiece is cut with a cutting tool. Subsequently, a mechanism included in the spindle according to embodiments discussed above moves the cutting tool in a radial direction of the spindle to adjust the distance between the rotational axis to the tip of the cutting tool for cutting a second cylindrical hole. Then, the inner wall of a second cylindrical hole of the same workpiece or another workpiece having a diameter different from that of the first cylindrical hole is cut with the same cutting tool. Thus, there is no need to disengage the cutting tool from the spindle or replace the cutting tool with another cutting tool between cutting the first cylindrical hole and cutting the second cylindrical hole.

As described above, according to embodiments of the present disclosure, the tool radius may be varied by adjusting the position of the insert tip 110 along the radial direction of the tool 100. By varying the tool radius as described above, it is possible to flexibly respond to composite processes, such as boring an engine cylinder, line-boring or facing a crank bore of a cylinder block, boring a valve seat and a guide of a cylinder, and the like, in which the radius of a workpiece varies during an operation.

Although the present disclosure has been described with reference to embodiments and the accompanying drawings, the present disclosure is not limited thereto, but may be variously modified and altered by those skilled in the art to which the present disclosure pertains without departing from the spirit and scope of the present disclosure.

Therefore, embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A spindle apparatus comprising:
a housing;
a spindle rotatably installed in the housing;
a tool releasably engaged with one end of the spindle and having an insert tip movable in a radial direction of the tool;
a first draw-bar movably mounted in the spindle; and
a second draw-bar movably mounted in the first draw-bar,
wherein the tool and one end of the first draw-bar are releasably engaged with the one end of the spindle by a movement of the first draw-bar,
wherein the insert tip is configured to move in the radial direction by a movement of the second draw-bar,
wherein the tool has a first passage formed in the radial direction and a second passage formed in an axial direction of the tool,
wherein the insert tip is mounted in the first passage to move along the radial direction of the tool,
wherein an adjustment member is mounted in the second passage to move along the axial direction of the tool, and
wherein the adjustment member is removably coupled to one end of the second draw-bar.

2. The spindle apparatus of claim 1, wherein the adjustment member is configured to move along the second passage of the tool by the movement of the second draw-bar, and
wherein the insert tip is configured to move along the first passage of the tool by the movement of the adjustment member.

3. The spindle apparatus of claim 2, wherein the insert tip has a first inclined surface, and
wherein the adjustment member has a second inclined surface making contact with the first inclined surface.

4. The spindle apparatus of claim 3, wherein the adjustment member has a shank,
wherein a shank holder is formed on the one end of the second draw-bar, and
wherein the shank and the shank holder are removably coupled together by rotation of the adjustment member.

5. The spindle apparatus of claim 4, wherein the shank has one or more coupling grooves and coupling protrusions formed on an outer surface of the shank to follow each other in series along an axial direction of the shank,
wherein the shank holder has one or more coupling protrusions formed on an inner surface of the shank holder,
wherein the coupling protrusions of the shank holder are inserted into the coupling grooves of the shank, and
wherein the coupling protrusions of the shank and the coupling protrusions of the shank holder are axially coupled together by the rotation of the adjustment member.

6. The spindle apparatus of claim 1, wherein a collet is mounted in the one end of the spindle, and wherein the collet is configured to expand or contract in the radial direction by the movement of the first draw-bar to clamp the one end of the first draw-bar.

7. The spindle apparatus of claim 6, wherein a clamp is disposed around the collet and engages the tool and the one end of the spindle.

8. The spindle apparatus of claim 7, wherein the clamp has one or more tapered surfaces formed on an inner surface of the clamp,
   wherein the collet has one or more tapered surfaces formed on an outer surface of the collet, and
   wherein the tapered surfaces of the collet and the tapered surfaces of the clamp are separably coupled together.

9. The spindle apparatus of claim 1, wherein the first draw-bar is configured to move along a first direction by a piston and to move along a second direction by an elastic member, and
   wherein the first direction and the second direction are opposite to each other.

10. The spindle apparatus of claim 1, wherein the second draw-bar is configured to move along first and second directions by an actuator.

11. The spindle apparatus of claim 10, wherein the actuator includes a drive motor, a lead screw connected to the drive motor, and a nut mounted on an outer surface of the lead screw to perform a screw motion,
   wherein the nut is secured to the housing,
   wherein the drive motor is connected to the second draw-bar, and
   wherein the second draw-bar is configured to move together with the drive motor as the lead screw rotates by operating the drive motor.

12. The spindle apparatus of claim 1, wherein the second draw-bar is released from or coupled with the spindle by a clutch unit in a rotational direction.

13. The spindle apparatus of claim 12, wherein the clutch unit includes:
   a first clutch member coupled to the second draw-bar;
   a second clutch member secured to the spindle;
   a clutch cap secured to the first clutch member; and
   one or more coupling members configured to removably couple the clutch cap and the second clutch member.

14. A method for operating a spindle apparatus that includes a spindle rotatably installed in a housing, a tool releasably engaged with one end of the spindle by a clamp and a collet, a first draw-bar movably mounted in the spindle, a second draw-bar movably mounted in the first draw-bar, a clutch unit configured to release or couple the second draw-bar and the spindle according to a rotational direction, and an insert tip configured to move in a radial direction of the tool, the method comprising:
   engaging the tool and one end of the first draw-bar with the one end of the spindle by moving the first draw-bar in a first direction; and
   moving the insert tip in the radial direction of the tool by moving the second draw-bar in the first direction or in a second direction;
   wherein the first direction and the second direction are opposite to each other in a lengthwise direction of the spindle,
   wherein the tool has a first passage formed in the radial direction and a second passage formed in an axial direction of the tool,
   wherein the insert tip is mounted in the first passage to move along the radial direction of the tool,
   wherein an adjustment member is mounted in the second passage to move along the axial direction of the tool, and
   wherein the adjustment member is removably coupled to one end of the second draw-bar.

15. The method of claim 14, wherein the tool and the one end of the first draw-bar are disengaged from the one end of the spindle by moving the first draw-bar in the second direction.

16. The method of claim 14, wherein the second draw-bar is connected to the tool by releasing the second draw-bar and the spindle in the rotational direction by releasing the clutch unit.

* * * * *